April 28, 1942. G. J. POLIVKA 2,281,454
MULTIPLE COLD MILK FILTER
Filed June 14, 1939 2 Sheets-Sheet 1

Inventor:
George J. Polivka
By: Milo B. Stevens & Co.
Atty's

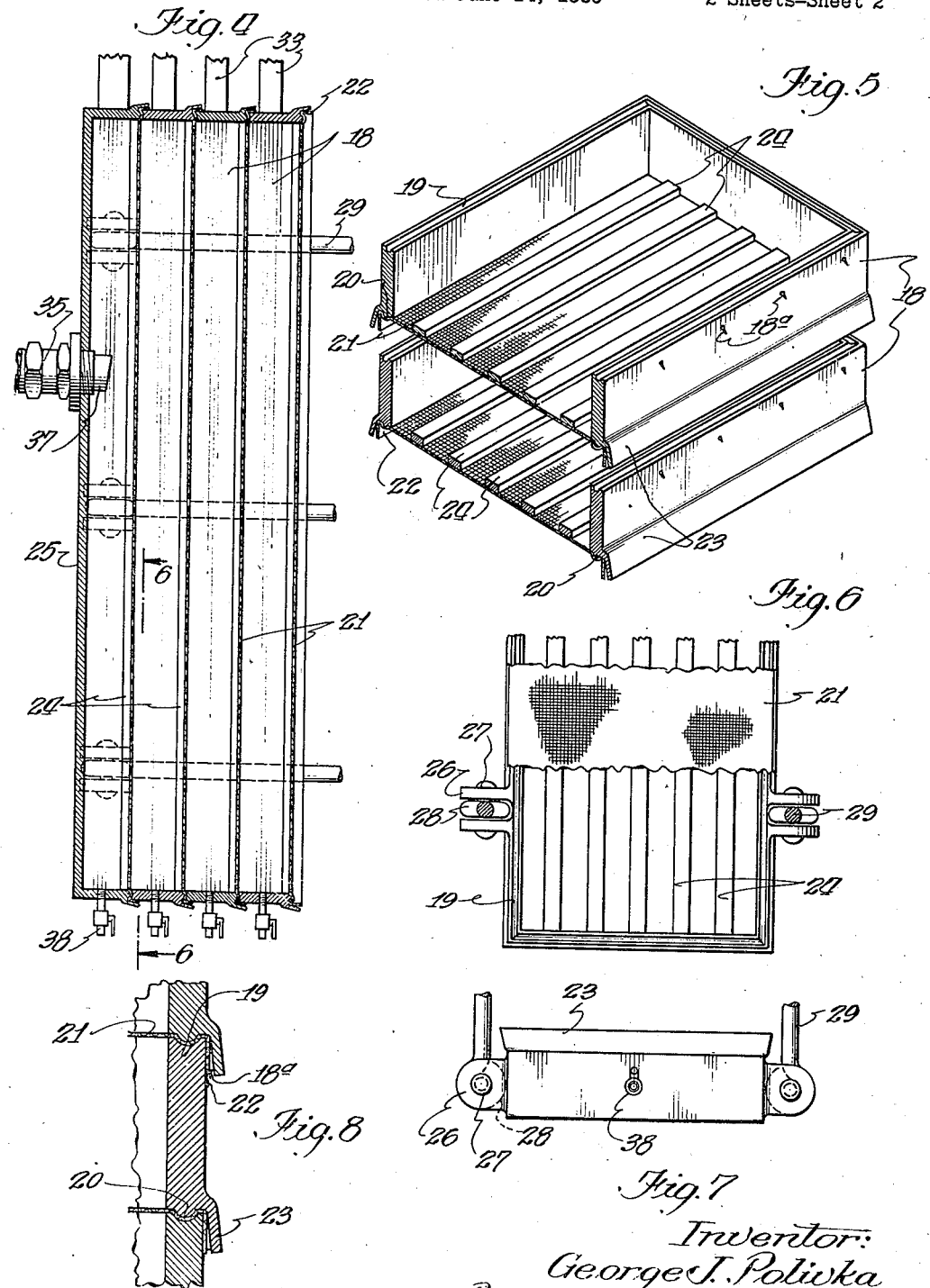

Patented Apr. 28, 1942

2,281,454

UNITED STATES PATENT OFFICE 2,281,454

MULTIPLE COLD MILK FILTER

George J. Polivka, La Grange, Ill.

Application June 14, 1939, Serial No. 279,179

3 Claims. (Cl. 210—188)

My invention relates to apparatus for filtering milk, and one of my objects is to provide an apparatus of this kind which serves to properly filter the milk while in the cold state and prior to pasteurization.

A further object of the invention is to provide a filter which removes sediment, foreign matter, milk curd, partially churned butter fat and other solid matter from the milk, in one continuous operation and at low pressure whereby to prevent the absorption of such undesirable substances into the milk when pasteurization takes place.

A still further object of the invention is to provide a filter formed as an assembly of units in which the filtering occurs by progressive stages.

Another object of the invention is to provide a filter employing a series of filtering cloths progressing from coarse to fine textures, whereby to clear and refine the milk by stages.

An additional object of the invention is to design the novel filter in the form of a series of frames between which the filtering cloths are disposed, and assemble or dismantle the series by simple means.

An important object of the invention is to construct the novel filter on lines of sanitation, simplicity, durability and ready adaptability to conditions in different milk producing plants.

With the above objects in view and any others which may suggest themselves from the description to follow, a better understanding of the invention may be had by reference to the accompanying drawings, in which—

Fig. 4 is an enlarged cross section of a portion of the filter;

Fig. 5 is a fragmental perspective, on an enlarged scale, showing the form of the units more clearly;

Fig. 6 is a section on the line 6—6 of Fig. 4;

Fig. 7 is a bottom view of Fig. 6; and

Fig. 8 is a magnified section of the joints employed between the filter units.

Figure 1:
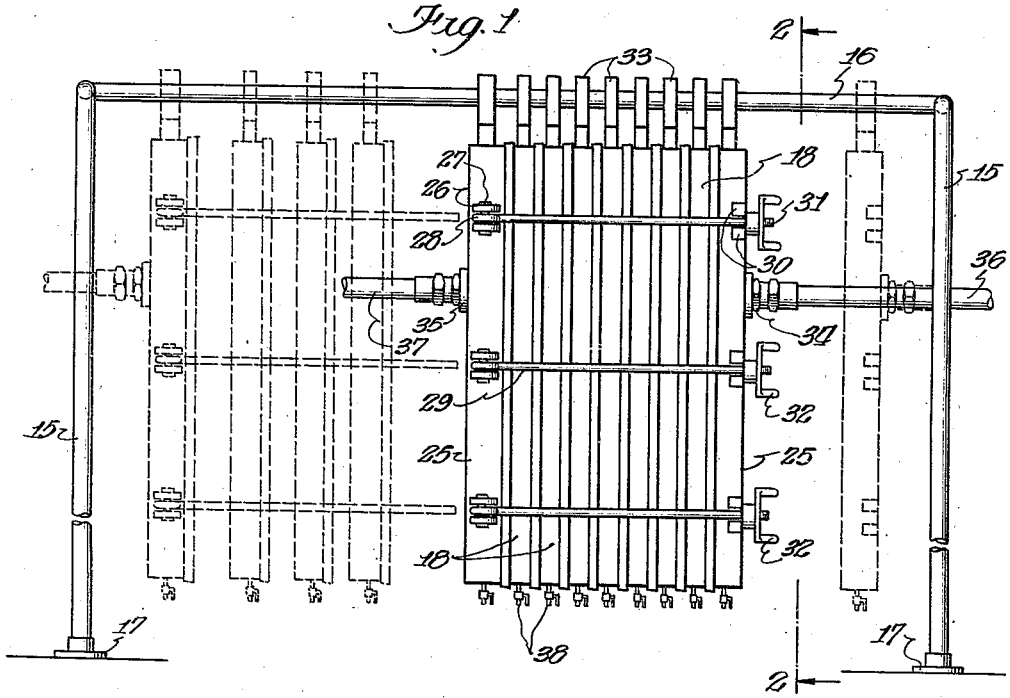
Fig. 1 is a side elevation of the novel filter, showing the manner of its separation by means of dotted lines.

In the treatment of fresh milk to divest it of foreign matter and solid impurities, filtering of the milk in the cold state through the closely-meshed cloth prescribed by dairy regulations is not possible, as the butter fat, cream globules and other fine solids in the milk soon clog the meshes of the cloth and the passage of the milk is checked. For this reason the filtering is done after the milk has been heated for pasteurization, the milk thus assuming a more freely flowing state. However, milk so filtered still contains a considerable amount of impurities, as heating serves to dissolve some of these into the milk; also, the filtering cloth intercepts matter which incubates undesirable bacteria at the temperature of heated milk and renders the filtering cloth an increasingly active influence to lower the purity standard of the milk. Thus, under the above conditions the use of a filtering cloth is limited, since it not only becomes a detriment in the sense mentioned, but also tends to clog in a short time and deter the filtering process. It has therefore been my intention to depart from the process just mentioned by providing adequate means to filter the milk by stages while it is cold, and to such an extent that it may eventually be passed through the fine filtering cloth without clogging or setting up contaminating influences in the same.

In accordance with the foregoing, specific reference to the drawings indicates a supporting stand for the filter at 15, the same consisting of two pairs of uprights between which extends a top bar 16. The uprights are made with suitable base fixtures 17 which are bolted or otherwise attached to a floor or other supporting surface.

The filter is composed of a series of vertical frames 18 assembled in face-to-face relation. The frames are preferably made of a strong, light metal which is proof to corrosion and harmless to milk as, for example, white metal.

Each unit is a rectangular frame, one of whose faces has a continuous longitudinal groove 19, while the other face has a similar bead 20, in order that the frames may be stacked as suggested in Fig. 5 and shown in Figs. 4 and 8, to make closing joints with each other.

Before the frames are assembled as just mentioned, the filtering cloths 21 are interposed in each of the joints, the cloths also serving as gaskets for the joints and being sufficiently large to have marginal overhanging portions 22, so that ample material will be had to assure full cloth coverage for each joint. The frames have marginal barbs or pins 18-a to secure the cloths after they have been stretched across the frames. Each frame has a marginal, flared flange 23 in the region of the external cloth edges, the purpose of the flanges being first to aline the frames when they are stacked or grouped, and second to cover the overhanging cloth edges which may be rough or uneven, so as to conceal such edges from view. Each frame 18 is formed with crossbars 24 along the course of the filtering cloths 21 in order to provide a backing or guide for the same. These bars have been shown as rectangular in cross section, but they may be round or otherwise; or, the formation may be a grid instead of a series of bars.

Figure 2:
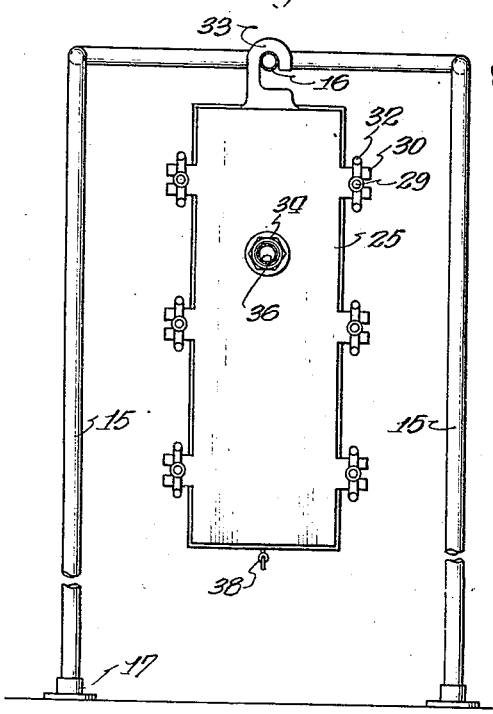
Fig. 2 is a frontal section, as taken on the line 2—2 of Fig. 1.

While the filter units may be more readily assembled by placing them horizontally and stacking them in order indicated in Fig. 5, with the filtering cloths therebetween, it is preferable that the assembly be vertically positioned when to be used. Thus, Figs. 1, 2 and 4 show the assembly so positioned. It must now be observed that the terminal units are closed on the outside, as indicated at 25, so that the filter is in a sense a large container formed by the assembly of ends and intermediate sections. The assembly is held together by forming the rear end units with pairs of ears 26 carrying crosspins 27 between them, three such pairs being shown at each side. Between the ears, eyes 28 forming one of the terminals of side links 29 are freely mounted on the pins 27. The links extend forwardly, passing between forked side flanges 30 of the frontal units 18 and then being threaded as indicated at 31 to receive hand nuts 32. It will be evident that the assembly of links and hand nuts forms a series of clamps to tightly join the box-like assembly, so as to render the same proof to the leakage or seepage of milk.

While the filter assembly may be supported in any suitable manner from the cross-bar 16, it is preferable to form each of its units 18 with a top hook 33 by means of which such unit is hung from the bar. Thus, the units are independently suspended, so that they may be separated along the cross-bar as indicated by dotted lines in Fig. 1 and easily handled or cleaned while receiving their support from the bar.

The terminal units of the filter are formed with suitable fittings 34 and 35 for inlet and outlet pipes 36 and 37 placed at a height shortly above the center. It is of course intended for the milk to be introduced into the filter by low pressure from the pipe 36, and to pass by stages through the filter to the discharge pipe 37. In entering, the milk encounters the filtering cloth 21 separating the first unit 18 from the next one, and this cloth is designed with a rather coarse mesh to stop fragments of wood, grass, hairs, curd, lumps of butter fat, partially frozen milk or cream from passing the screen. The next filtering cloth in the series is of course slightly closer in texture, so that smaller particles of solid matter, milk curd and partially churned butter fat are checked from passage. The following filtering cloths become progressively finer in texture, so that finally all foreign or undesirable matter is filtered from the milk, and the latter is divested of such ingredients as may affect its clarity, purity and flavor.

Figure 3:
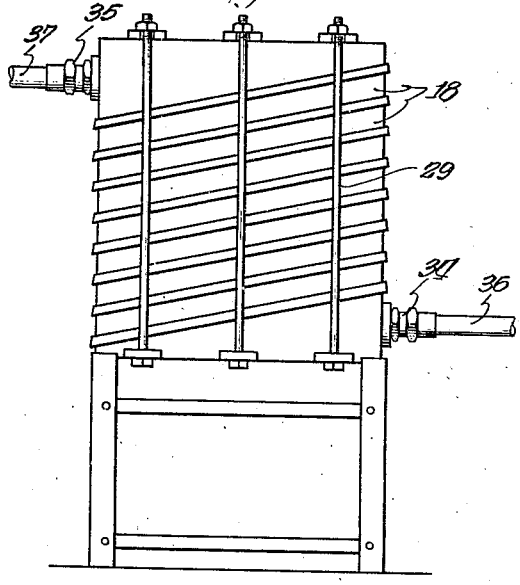
Fig. 3 is a side elevation of a modification.

After the filter has been in use for some time, its filtering cloths have become coated with sediment to a point beyond which they would lose their efficiency or present resistance to the passage of the milk if kept in use. It is therefore necessary to replace the cloths, and in such event the filter must be cleared of all milk residue before it is taken apart. The vertical position of the filter as shown in Figs. 1 and 2 facilitates the complete drainage of the filter, pet cocks 38 being provided at the bottom of the units to accomplish this purpose. The modification of Fig. 3 shows a vertically-stacked filter apparatus in which the drainage feature is not employed. This form of apparatus is more compact but must be dismantled in order to clear it from milk residue preparatory to the changing of its filtering cloths.

It will be evident from the above description that I have provided a filter which is exceedingly simple in its unitary construction, yet is built in a compact assembly which is so clamped as to be proof to the leakage or seepage of milk. The apparatus is designed for the easy application of the necessary number of filtering cloths, and is of a nature to be constructed with any number of units, according to the capacity desired for the filter or the extent of progressive refinement of the filtering cloths. Yet, all the units are independently suspended, so as to position them for handling, cleaning, separation or assembly with safety. Further, the joints between the units are of a nature to tightly pack the filtering cloths between them, making gaskets unnecessary for the sealing of the joints, while the external flanges 23 conceal the edges of the filtering cloths from view. The filter is capable of having a sufficient capacity for continuous operation, so that a given set of filtering cloths may be used at their highest efficiency for a prescribed period. Further, the nature of assembling the filter and applying its filtering cloths renders the apparatus flexible to suit conditions in different dairies, so that the number of cloths and the texture thereof may be varied in accordance with the quality or standard of the milk, or its temperature when received, in each dairy. By reason of the gradual refinement in the filtering cloths and also the plurality thereof, an ample course for the travel of the milk is afforded, so that a low pressure and minimum of power may be employed to pass the milk through the filter. Finally, the simplicity of the parts entering into the novel filter, as well as the duplicate nature thereof, make the filter inexpensive to build, so that its cost is soon absorbed by the value gained in operating efficiency and the standard of purity in the product.

While I have described the novel filter and its modification along specific lines, various minor changes and refinements may be made therein without departing from their principle, and I desire to consider all such changes and refinements as coming within the scope and spirit of the appended claims.

I claim:

1. A filter comprising a series of laterally-assembled units, filtering means between the units, closures endwise of the latter, means to clamp the assembly firmly together, and upwardly directed means for removably suspending the assembly from a horizontal support.

2. The structure of claim 1, said upwardly directed means being a series of hooks.

3. The structure of claim 1, said upwardly directed means being a series of hooks rising individually from said units and closures.

GEORGE J. POLIVKA.